United States Patent
Tsai et al.

(10) Patent No.: US 9,593,987 B2
(45) Date of Patent: Mar. 14, 2017

(54) METHOD FOR DETECTING PRELOAD RESIDUAL RATE

(71) Applicant: HIWIN TECHNOLOGIES CORP., Taichung (TW)

(72) Inventors: Meng-Shiun Tsai, Chia-Yi County (TW); Wen-Hsin Hsieh, Chia-Yi County (TW); An-Shik Yang, Taipei (TW); Wei-Hsiang Yuan, New Taipei (TW); Hong-Wei Huang, Chia-Yi County (TW); Chung-Ching Liu, Chia-Yi County (TW); Yih-Chyun Hwang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 434 days.

(21) Appl. No.: 14/454,344

(22) Filed: Aug. 7, 2014

(65) Prior Publication Data

US 2015/0377719 A1    Dec. 31, 2015

(30) Foreign Application Priority Data

Jun. 25, 2014   (TW) .............................. 103121987 A

(51) Int. Cl.
    *F16H 25/22*    (2006.01)
    *G01K 3/10*    (2006.01)
    (Continued)

(52) U.S. Cl.
    CPC ......... *G01K 13/08* (2013.01); *F16H 25/2204* (2013.01); *G01K 3/10* (2013.01); *G01L 1/00* (2013.01); *F16H 25/2209* (2013.01)

(58) Field of Classification Search
CPC .............................. F16C 2233/00; G01K 3/10
See application file for complete search history.

(56) References Cited

U.S. PATENT DOCUMENTS 5,959,189 A * 9/1999 Jeng ...................... G01M 13/04
                                             73/10
6,260,004 B1 * 7/2001 Hays .................. G05B 23/0235
                                        702/130

(Continued)

FOREIGN PATENT DOCUMENTS

JP        61088015 A * 5/1986
JP        61221601 A * 10/1986

(Continued)

*Primary Examiner* — Minh Phan
*Assistant Examiner* — Leon W Rhodes, Jr.
(74) *Attorney, Agent, or Firm* — Muncy, Geissler, Olds & Lowe, P.C.

(57) ABSTRACT

A method for detecting a preload residual rate involves: a. installing a temperature sensor on one of two preloaded elements; b. making the two preloaded elements to move with respect to each other, and recording a time-related temperature variation sensed by the temperature sensor, so as to obtain an initial temperature-rising curve; c. making the two preloaded elements to move with respect to each other, and recording a time-related temperature variation sensed by the temperature sensor, so as to obtain a detected temperature-rising curve; and d. comparing the initial and detected temperature-rising curves, so as to obtain the preload residual rate between the two preloaded elements of the step c to the step b. The method detects a preload residual rate applied to an object when the object is operating while being advantageous in terms of cost, service life, response and accuracy.

12 Claims, 3 Drawing Sheets

(51) Int. Cl.
G01K 13/08 (2006.01)
G01L 1/00 (2006.01)

(56) References Cited

U.S. PATENT DOCUMENTS

| | | | | |
|---|---|---|---|---|
| 6,360,616 | B1 * | 3/2002 | Halliday | G01L 5/0009 73/862.49 |
| 8,253,575 | B2 * | 8/2012 | Matsunaga | B23Q 1/70 340/584 |
| 8,469,597 | B2 * | 6/2013 | Smith | F16C 19/163 384/448 |
| 2011/0096808 | A1 * | 4/2011 | Hwang | F16H 25/2021 374/141 |

FOREIGN PATENT DOCUMENTS

| | | | | |
|---|---|---|---|---|
| JP | 02221747 | A | * | 9/1990 |
| JP | 09210861 | A | * | 8/1997 |
| JP | 11028637 | A | * | 2/1999 |
| JP | 2000046141 | A | * | 2/2000 |
| JP | 2008025676 | A | * | 2/2008 |
| JP | 2008298254 | A | * | 12/2008 |
| JP | 2009036312 | A | * | 2/2009 |
| JP | 2009068533 | A | * | 4/2009 |
| JP | 2010025826 | A | * | 2/2010 |
| KR | 19980044371 | U | * | 9/1998 |
| TW | 201122258 | A | * | 7/2011 |
| TW | 201208804 | A | * | 3/2012 |
| TW | M430540 | U | * | 6/2012 |
| TW | 201319539 | A | * | 5/2013 |

* cited by examiner

METHOD FOR DETECTING PRELOAD RESIDUAL RATE

BACKGROUND OF THE INVENTION

1. Technical Field

The present invention relates to preload detection, and more particularly to a method for detecting a preload residual rate.

2. Description of Related Art

Conventionally, in many feeding or driving devices, such as ball screw devices, linear guides, gear mechanisms, a preload is applied between two preloaded elements that are configured to move with respect to each other during the manufacturing or fabricating process, in order to eliminate backlash and enhance structural rigidity, thereby ensuring high-speed and high-accuracy performance.

Taking a ball screw device for example, large balls are arranged between its screw and nut to provide such preload. However, during operation, the balls rub against the screw and the nut and the resultant wear tends to make the preload decrease over time, which in turn adversely affects the accuracy of positioning and eventually causes lost motion. Therefore, if an operator fails to replace the balls before the preload becomes invalid, the accuracy of the device can degrade. However, if the balls are replaced regularly without considering the wearing status, there may be usable balls replaced and wasted uneconomically. Thus, a preferable solution shall involving detecting the preload and making part replacement right before the preload reduces to a preset threshold.

A traditional approach to determining the current preload for a ball screw device is to use a force gauge hooking the nut, measuring, and converting the detected spring force into the preload of the ball screw device. However, for performing this traditional approach, the ball screw device has to be shut down because measurement during operation is impossible. Besides, the conversion involves substituting some relevant physical parameters (e.g. coefficient of elasticity), and tends to be inaccurate in the event of incorrect parameters or fault calculation. Another known preload-measuring method involves using a torque gauge to measure the ball screw's torque variation, and converting the measured torque into the screw's preload. Yet this method has its advantages related to the torque gauge that is usually costly and tends to get worn and become unusable soon. One more existing method for measuring a ball screw's preload is to use an accelerometer or a displacement meter to measure the vibration of the ball screw and estimate the remained preload accordingly. However, this method is subject to interference from noise caused by external sources of vibration, and is less accurate.

BRIEF SUMMARY OF THE INVENTION

In view of the shortcomings of the prior-art devices as described previously, it is the primary objective of the present invention to provide a method for detecting a preload residual rate, which is capable of detecting the preload residual rate applied to a subject when the subject is operating, and is more economic, durable, responsive and accurate as compared to the prior-art devices.

For achieving this objective, the disclosed method comprising steps of:

a. installing a temperature sensor on one of two preloaded elements that are configured to move with respect to each other;

b. making the two preloaded elements to move with respect to each other, and simultaneously recording a time-related temperature variation sensed by the temperature sensor, so as to obtain an initial temperature-rising curve;

c. making the two preloaded elements to move with respect to each other, and simultaneously recording a time-related temperature variation sensed by the temperature sensor, so as to obtain a detected temperature-rising curve; and d. comparing the initial temperature-rising curve with the detected temperature-rising curve, so as to obtain the preload residual rate between the two preloaded elements of the step c to the step b.

For example, the two preloaded elements may be a screw and a nut in a ball screw device. The steps a and b are performed at a manufacturer's side, while the steps c and d are performed at a user's side. As the ball screw device's preload decreases, the friction between the balls and the screw/nut and the heat it generates also decrease. Therefore, be comparing the screw's or nut's current temperature-rising curve with its original temperature-rising curve, the preload residual rate can be determined.

Thereby, the present invention is capable of detecting a preload currently applied to a subject (i.e. the two preloaded elements) without the need of shutting down the subject from on-going operation. Moreover, since the temperature sensor is inexpensive and free from being worn, the disclosed method is economic and durable. The temperature sensor also features for fast response. Additionally, the method works without involving complicated analysis and equation calculation where physical parameters are to be substituted. Hence, the method of the present invention provides improves robustness and more accurate detection results.

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
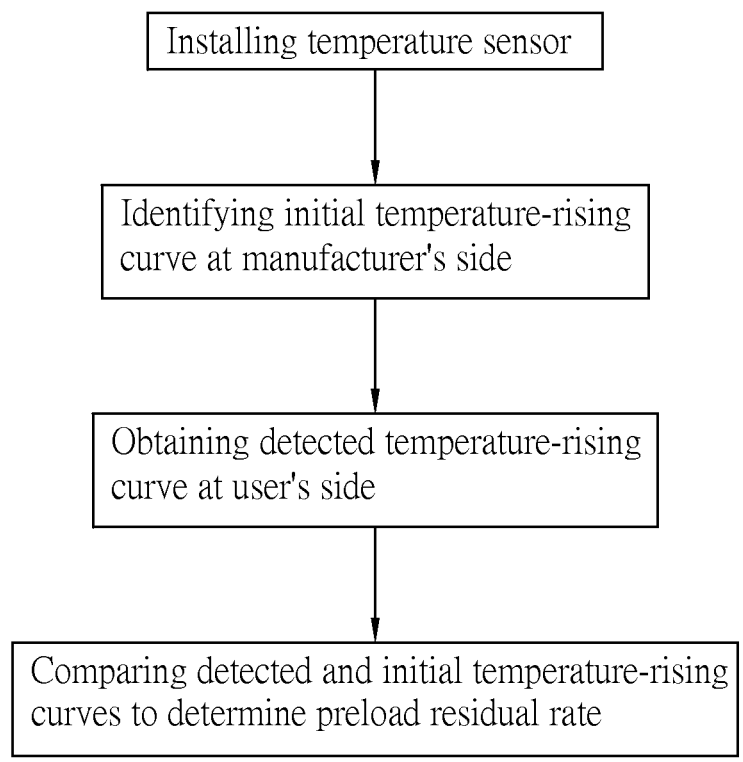
FIG. 1 is a flowchart of a method for detecting a preload residual rate according to one preferred embodiment of the present invention.

In the embodiments and accompanying drawings described below, similar reference numerals denote identical or similar elements or structural features.

Please refer to the drawings for one preferred embodiment of a method for detecting preload residual rate as disclosed in the present invention that comprises the steps given below.

In a first step (a), a temperature sensor 30 is installed on one of two preloaded elements 10, 20 that are configured to move with respect to each other.

According to the present embodiment, the disclosed method is realized in a ball screw device 40, and the two preloaded elements 10, 20 herein are a screw and a nut of the ball screw device 40, respectively. The temperature sensor 30 is a thermocouple or another sensor that is capable of detecting a temperature variation caused by heat generated by the friction between the screw 10 or the nut 20 and plural balls 50 installed therebetween.

Figure 2:
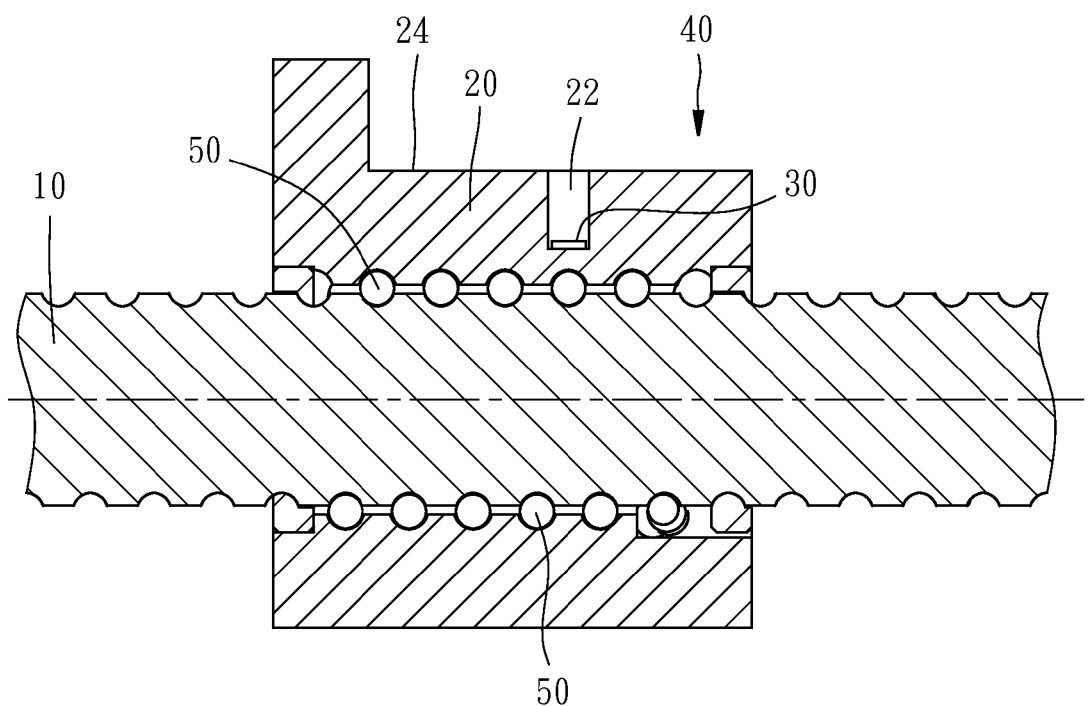
FIG. 2 and FIG. 3 are cross-sectional views of a ball screw device where the disclosed method is applied, showing a temperature sensor located alternative in two places.
Figure 3:
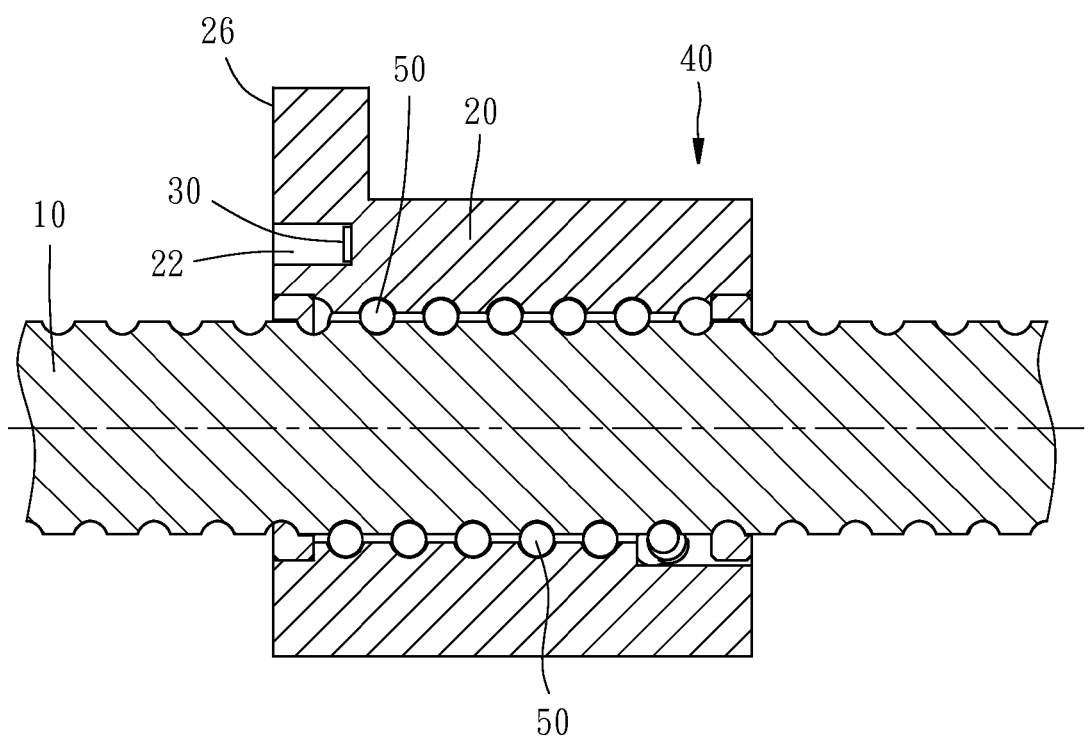

In the present embodiment, the temperature sensor 30 is installed on the nut 20. Alternatively, it can be installed on the screw 10. For ensuring the detection of the temperature variation being accurate and independent from the ambient air, the nut 20 may have a receiving hole 22 for allowing the temperature sensor 30 to be installed therein. For example, the receiving hole 22 may be depressed from an outer periphery 24 of the nut 20 toward the screw 10, as shown in FIG. 2. Alternatively, the receiving hole 22 may be depressed from an end surface 26 of the nut 20 near the screw 10. Thereby, the temperature sensor 30 is located closely to the screw 10 and the balls 50, so as to sense the temperature variation more with improved sensibility.

In a second step (b), the two preloaded elements 10, 20 are moved with respect to each other, and how the temperature varies with time as sensed by the temperature sensor 30 is recorded, so as to obtain an initial temperature-rising curve 60.

When the ball screw device 40 operates, the balls 50 rub against the screw 10 and the nut 20 and in turn make their temperatures go up. Such generation of heat by friction happening in the screw 10 and the nut 20 may be expressed by the following equation:

$$c \cdot \Delta T \cdot m = F \cdot \Delta S$$

Therein, c is the specific heat of the screw 10 or the nut 20, m is its mass, F is the friction between the screw 10 or the nut 20 and the balls 50, $\Delta S$ is the equivalent displacement of the nut 20 against the threaded bevel of the screw 10, and $\Delta T$ is the temperature increment happening at the screw 10 or the nut 20. The friction F is generated when the screw 10 or the nut 20 receives a preload $F_p$ perpendicular to its axis acting thereon. Thus, the friction F may be expressed by the following equation:

$$F = F_p \cdot \sin \rho \cdot \mu$$

Therein, $\rho$ is the lead angle of the screw 10, $F_p \cdot \sin \rho$ is the normal force toward the threaded bevel decomposed from the preload $F_p$, and $\mu$ is the friction coefficient. The linear displacement $\Delta S_{axial}$ of the nut 20 along the screw 10 has relation with $\Delta S$ that may be expressed by the following equation:

$$\Delta S_{axial} = \Delta S \cdot \sin \rho$$

By differentiating the three equations with respect to time once, it is derived that the preload $F_p$ and the temperature-rising rate $\Delta T/\Delta t$ has relation of:

$$\Delta T/\Delta t = (\mu/mc) \cdot (\Delta S_{axial}/\Delta t) \cdot F_p$$

Figure 4:
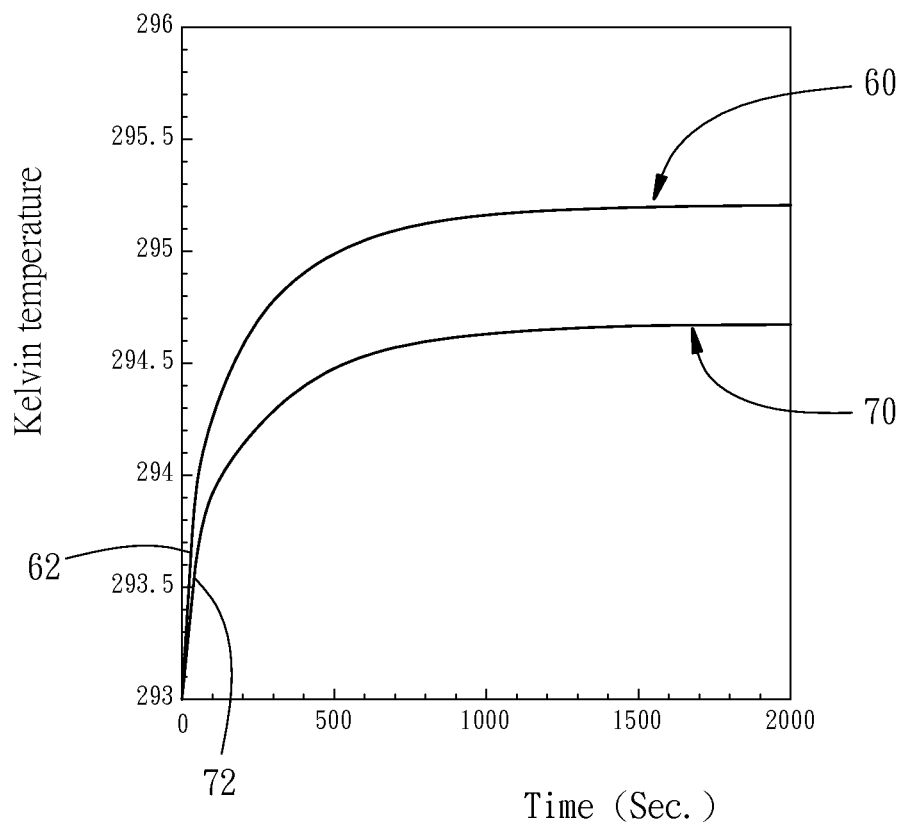
FIG. 4 is a temperature-time curve graphic, showing an initial temperature-rising curve and a detected temperature-rising curve according to the disclosed method.

Thus, when the nut 20 moves linearly along the screw 10 at a constant velocity ($\Delta S_{axial}/\Delta t$), the preload $F_p$ is in direct proportion to the temperature-rising rate $\Delta T/\Delta t$. During the step b, the preload $F_p$ may be regarded as constant, so the temperature-rising rate $\Delta T/\Delta t$ is also constant. As shown in FIG. 4, at the early stage of the operation of the ball screw device 40 (between 0 and $50^{th}$ second), the initial temperature-rising curve 60 has an almost straight linear segment 62. At this time, the temperature-rising rate $\Delta T/\Delta t$ of the screw 10 and the nut 20 is constant, and is the slope of the linear segment 62. After the ball screw device 40 operates for a period, as the convection between the friction-generated heat and the ambient air increases, the initial temperature-rising curve 60 becomes non-linear, and the temperature finally becomes stable.

In a third step (c), the two preloaded elements 10, 20 are moved with respect to each other, and a time-related temperature variation is recorded by the temperature sensor 30, so as to obtain a detected temperature-rising curve 70.

The steps a and b may be performed at a manufacturer's side 40, while the steps c and d may be performed at a user's side 40, so as to measure the temperature-rising curve 70 and the preload residual rate when the screw 10 or the nut 20 itself and the balls 50 may have been worn to a certain extent. As shown in FIG. 4, the detected temperature-rising curve 70 also has an almost straight linear segment 72 in the period where the ball screw device 40 just starts to operate. At this time, the temperature-rising rate $\Delta T/\Delta t$ of the screw 10 and the nut 20 is constant, and is the slope of the linear segment 72.

In a fourth step (d), the initial temperature-rising curve 60 and the detected temperature-rising curve 70 are compared so as to obtain the preload residual rate between the two preloaded elements 10, 20 in the step c as compared to the step b.

As the preload $F_p$ of the ball screw device 40 reduces, the friction F between the screw 10 or the nut 20 and the balls 50 and the heat it generates also decrease, and the temperature-rising rate $\Delta T/\Delta t$ decreases correspondingly. According to the foregoing equation, temperature-rising rate $\Delta T/\Delta t$ is in direct proportion to $(\Delta S_{axial}/\Delta t) \cdot F_p$. Therefore, by referring to the velocity $(\Delta S_{axial}/\Delta t)$ of the nut 20 moving along the screw 10 linearly and the temperature-rising curves 60, 70, a ratio between the preload remained in the used ball screw device 40 and the original preload of the just-made ball screw device 40 can be obtained as the aforementioned preload residual rate.

In the method of the present invention, the velocity for moving the two preloaded elements 10, 20 with respect to each other may be set identical for both of the step c and the step b. In the present embodiment, this means that the nut 20 moves along the screw 10 linearly at an identical velocity $(\Delta S_{axial}/\Delta t)$ in the step c and the step b. By setting so, the preload $F_p$ of the ball screw device 40 is in direct proportion to the temperature-rising rate $\Delta T/\Delta t$. In the step b, the initial temperature-rising curve 60 may be used to derive an initial temperature-rising rate, or the slope of the linear segment 62 of the initial temperature-rising curve 60. In the step c, the detected temperature-rising curve 70 may be used to derive a detected temperature-rising rate, or the slope of the linear segment 72 of the detected temperature-rising curve 70. The preload residual rate in the step d is a ratio between the detected temperature-rising rate and the initial temperature-rising rate.

In other words, as long as the initial temperature-rising curve 60 and the detected temperature-rising curve 70 are measured, the preload residual rate of the ball screw device 40 can be calculated using the slopes of their linear segments 62, 72, without the need of substituting other physical parameters into any equations. Therefore, the disclosed method provides improved robustness, and the detection is more accurate. In addition, the disclosed method can perform detection on subjects (i.e. the two preloaded elements 10, 20) that are operating. Furthermore, the disclosed method uses the temperature sensor 30 for detection and is more economic, durable and responsive as compared to the prior art.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for detecting a preload residual rate, the method comprising steps of:
   a. installing a temperature sensor on one of two preloaded elements that are configured to move with respect to each other;
   b. making the two preloaded elements to move with respect to each other, and simultaneously recording a time-related temperature variation sensed by the temperature sensor, so as to obtain an initial temperature-rising curve;
   c. making the two preloaded elements to move with respect to each other, and simultaneously recording a time-related temperature variation sensed by the temperature sensor, so as to obtain a detected temperature-rising curve; and
   d. comparing the initial temperature-rising curve with the detected temperature-rising curve, so as to obtain the preload residual rate between the two preloaded elements of the step c to the step b.

2. The method of claim 1, wherein in the steps b and c the two preloaded elements move with respect to each other at an identical velocity.

3. The method of claim 1, wherein the two preloaded elements are a screw and a nut of a ball screw device, and the steps a and b are performed at a manufacturer's side, while the steps c and d are performed at a user's side.

4. The method of claim 3, wherein in the steps b and c the nut moves along the screw linearly at an identical velocity.

5. The method of claim 2, wherein the step b further comprises deriving an initial temperature-rising rate from the initial temperature-rising curve, and the step c further comprises deriving a detected temperature-rising rate from the detected temperature-rising curve, in which the preload residual rates of the step d is a ratio between the detected temperature-rising rate and the initial temperature-rising rate.

6. The method of claim 5, wherein each of the initial temperature-rising curve and the detected temperature-rising curve has an almost straight linear segment, in which the initial temperature-rising rate and the detected temperature-rising rate are slopes of the linear segments of the initial temperature-rising curve and the detected temperature-rising curve, respectively.

7. The method of claim 4, wherein the step b further comprises deriving an initial temperature-rising rate from the initial temperature-rising curve, and the step c further comprises deriving a detected temperature-rising rate from the detected temperature-rising curve, in which the preload residual rates of the step d is a ratio between the detected temperature-rising rate and the initial temperature-rising rate.

8. The method of claim 7, wherein each of the initial temperature-rising curve and the detected temperature-rising curve has an almost straight linear segment, in which the initial temperature-rising rate and the detected temperature-rising rate are slopes of the linear segments of the initial temperature-rising curve and the detected temperature-rising curve, respectively.

9. The method of claim 3, wherein the nut has an outer periphery, and a receiving hole depressed from the outer periphery toward the screw for allowing the temperature sensor to be installed therein.

10. The method of claim 3, wherein the nut has an end surface, and a receiving hole depressed from the end surface near the screw for allowing the temperature sensor to be installed therein.

11. The method of claim 1, wherein the element on which the temperature sensor is installed has receiving hole for allowing the temperature sensor to be installed therein.

12. The method of claim 1, wherein the temperature sensor is a thermocouple.

* * * * *